(12) United States Patent
Apostolos

(10) Patent No.: US 7,123,181 B2
(45) Date of Patent: Oct. 17, 2006

(54) SURVEILLANCE METHOD AND APPARATUS

(75) Inventor: John T. Apostolos, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 233 days.

(21) Appl. No.: 10/716,816

(22) Filed: Nov. 19, 2003

(65) Prior Publication Data

US 2005/0146457 A1    Jul. 7, 2005

Related U.S. Application Data

(62) Division of application No. 10/142,290, filed on May 9, 2002, now Pat. No. 6,677,883.

(51) Int. Cl.
 *G01S 7/36* (2006.01)
 *G01S 7/41* (2006.01)
 *G01R 23/00* (2006.01)

(52) U.S. Cl. .......................... 342/13; 342/42; 342/192; 324/76.19; 324/76.35

(58) Field of Classification Search .................. 342/13, 342/42, 44, 46, 51, 89, 94, 178, 192; 324/19, 324/22, 23, 35, 76, 76.19, 76.23; 340/539.1; 455/456.1
See application file for complete search history.

(56) References Cited

U.S. PATENT DOCUMENTS

| | | | | |
|---|---|---|---|---|
| 4,005,417 A | * | 1/1977 | Collins | 342/192 |
| 4,190,362 A | * | 2/1980 | Dubrunfaut | 356/5.07 |
| 4,733,237 A | * | 3/1988 | Apostolos et al. | 342/13 |
| 4,743,110 A | * | 5/1988 | Arnaud et al. | 356/5.09 |
| 5,271,036 A | * | 12/1993 | Lobert et al. | 375/227 |
| 6,091,327 A | * | 7/2000 | Heed et al. | 340/506 |
| 6,147,646 A | * | 11/2000 | Arneson et al. | 342/417 |
| 6,366,627 B1 | * | 4/2002 | Apostolos et al. | 375/350 |
| 6,427,121 B1 | * | 7/2002 | Brodie | 701/213 |
| 6,859,831 B1 | * | 2/2005 | Gelvin et al. | 709/224 |
| 2001/0006372 A1 | * | 7/2001 | Lemelson et al. | 342/45 |

* cited by examiner

*Primary Examiner*—Thomas H. Tarcza
*Assistant Examiner*—Isam Alsomiri
(74) *Attorney, Agent, or Firm*—Daniel J. Long; Robert K. Tendler

(57) ABSTRACT

An inexpensive, small, low-power consumption, wide-band, high resolution spectrum analyzer is provided as a listening device for throw-away applications such as surveillance that involve deployment of large numbers of battery-powered spectrum analyzer modules to detect a signal source such as two-way radio traffic. Power requirements are minimized by the utilization of only one chirp generator to elongate battery life while providing a high resolution result. In order to minimize power drain the spectrum analyzer includes a single compound-chirp Fourier Transform generator. The compound chirp generator is used in one embodiment with a surface acoustic wave, SAW, dispersive delay line in conjunction with a surface electromagnetic wave, SEW dispensive delay line. The compound chirp generator permits performing two spectrum analysis functions, one resulting in coarse resolution frequency bins, and the other resulting in refining the coarse resolution bins into fine resolution frequency bins for the high resolution required for signal recognition.

4 Claims, 4 Drawing Sheets

SURVEILLANCE METHOD AND APPARATUS

This is a divisional of application(s) Ser. No. 10/142,290 filed on May 9, 2002 now U.S. Pat. No. 6,677,883

FIELD OF INVENTION

This invention relates to surveillance and more particularly to the use of spectrum analyzer listening devices distributed over a given area which include the use of a combination wideband/narrowband compressive receiver to achieve wideband coverage with high resolution capability.

BACKGROUND OF THE INVENTION

There has long been a need in the surveillance field to be able to detect and identify the presence of RF signals to be able to locate either enemy forces or, for instance, perpetrators of crimes in which either of these entities are utilizing RF communications. In the case of battlefield scenarios, communications between combat units or between the troops themselves is often carried over two-way radio links. In terms of the perpetrators of crimes, both cellular phone and other two-way communication links provide the perpetrators with necessary communications for their purposes.

While there exists many airborne snooping devices that can monitor RF communications, pinpointing the source of transmission is oftentimes elusive. Moreover, while it is possible with signal recognition algorithms to be able to identify a particular signal source, it is only with difficulty that the location of the signal source can be rapidly ascertained due to its intermittent nature.

There is therefore a requirement to be able to monitor troop movements or the movements of perpetrators through intercepting their RF transmissions, preferably with listening devices which are spaced apart on the ground at known locations. The problem with such listening devices is that they are by their very nature battery-powered so that once deployed their longevity is determined by the power drain of the individual devices.

Not only are the listening devices constrained by power regimes, their ability to identify a particular transmission from all other electromagnetic radiation in the area is of importance so that the source of the transmission can be identified by its spectral signature. Moreover, identifying the existence of a signal of interest is insufficient by itself to give the geographic location of the signal source.

In the past, and as will be documented below, the spectral signature of the transmission can be monitored in terms of histograms so that the source itself can be identified accurately. Such systems require a spectrum analyzer to be able to ascertain the spectral components, including frequency and amplitude of the components of the intercepted signals.

However, conventional spectrum analyzers are in general not portable, and more particularly consume large amounts of power in order to provide spectral content with sufficient resolution to be able to make a determination of the particular source of the intercepted signal.

As illustrated in U.S. Pat. No. 4,305,159 issued to Chester E. Stromswold, John T. Apostolos, Robert T. Boland, and Walter J. Albersheim, assigned to the assignee hereof and incorporated herein by reference, a compressive receiver is described in which the traditional envelope detector is replaced with a Fourier transform device such that the output of the dispersive delay line utilized in the receiver is processed to yield the spectrum of incoming signals. As mentioned in this patent, in order to permit spectral analysis of many signals over wide bandwidths, an especially wide bandwidth dispersive delay line is required along with a sweep-to-sweep phase coherent variable frequency oscillator.

It will be appreciated that the compressive receiver described in the above-noted patent is one that can analyze only a single frequency bin at a time. This made the prior art compressive receivers both high-cost, high power consuming and slow due to the fact that only one frequency bin could be analyzed at a time.

Not only is this prior art compressive receiver slow, a major power consuming cost component is the sweep to sweep phase coherent variable frequency oscillator, referred to as a chirp generator. The purpose of the chirp generator is to provide frequency changes which match the frequency changes associated with the dispersive display line. Note that dispersive delay lines are dispersive in the sense that their delay changes with frequency.

When contemplating the utilization of a battery-operated field-deployed spectrum analyzer to listen for incoming signals and report their presence to a central location for surveillance purposes, the chirp generator is the device in the compressive receiver which utilizes the most energy. Dispersive delay lines are passive devices, and the gates utilized to provide the frequency bins are likewise extremely low-power devices.

On the other hand chirp generators typically draw 200 milliamps, and if simply left on for surveillance purposes would result in the running down of a battery in for instance, four hours.

Moreover, a spectrum analyzer associated with a single chirp generator would result in frequency bins of, for instance 20 megahertz. A 20 megahertz wide spectral line is very broad and offers very little in the way of a spectral fingerprint.

What this means is that the spectral content of an incoming signal cannot be adequately analyzed by a compressive receiver with a single dispersive delay line and a single chirp generator.

The ability to not only indicate the presence of an incoming signal, but also to be able to identify it by its spectral components is indeed important in the surveillance field. In battlefield conditions or other surveillance opportunities, it is important not only to know that there is an incoming signal, but also to be able to characterize it as to what type of signal it is so that its source can be identified. One way of identifying the origin of the signal is to utilize the technique described in U.S. Pat. No. 4,166,980 entitled: Method And Apparatus For Signal Recognition, by John T. Apostolos and Robert P. Boland, assigned to the assignee hereof and incorporated herein by reference. The system described by this patent utilizes histograms to be able to characterize the intercepted signal by the number of occurrences of their spectral lines, their frequency and their amplitudes.

In order to completely characterize the existence and identify an incoming signal, it is therefore important to be able to provide a spectral analysis of the incoming signal in terms of the amplitude and frequency components thereof. It is also important to be able to provide a spectrum analyzer which is indeed wideband so that whatever the frequency of the incoming signal is, it is analyzable by the spectrum analyzer. The resolution of the spectrum analyzer is likewise important.

For compressive receivers of the type described in U.S. Pat. No. 4,305,159, the degree of resolution for the spectral lines is determined by the characteristics of the dispersive delay line. With a single dispersive delay line in one instance the frequency bins are 20 megahertz wide.

This type of system is therefore incapable of determining the precise position of the spectral lines of the incoming signal.

By way of further background, for instance, if the spectrum analyzer listening devices and respective transmitters were dropped or placed along a path in a battlefield situation to listen for signal intelligence in the form of two-way radio traffic, in an unattended situation, it is important that the units operate over a sufficiently long period of time to provide adequate surveillance. Thus, for instance, with a typical chirp generator and with a lithium hydride battery of 0.8 amp hours, then it will be appreciated that the battery if fully charged at the beginning of the mission would run down in approximately four hours. This would give four hours worth of surveillance.

However, if the resolution of the spectrum analyzer is not sufficient to identify the incoming signals, then the relatively coarse frequency bins must be further analyzed by an additional spectrum analyzer in order to obtain the spectral signature of the incoming signal. This in turn virtually doubles the power consumption required such that the surveillance might only take place over two hours as opposed to four hours.

The above precludes spreading of a number of spectrum analyzer listening devices over a given battle or surveillance area to pick up and identify signals due to the high battery drain.

Moreover, the cost of a spectrum analyzer module of the type described in U.S. Pat. No. 4,305,159 is primarily dependent on the cost of the chirp generator. The dispersive delay line and the gate are relatively inexpensive items, but with the requirement of sweep-to-sweep phase coherence for the chirp generator, the generator is relatively costly. If one were to deploy for instance one hundred of these spectral analyzers over a battlefield or surveillance area, then the cost of so doing is considerable. Add to this the cost of additional spectrum analyzers to refine the results of the single chirp spectrum analyzer, then the cost clearly becomes prohibitive.

SUMMARY OF THE INVENTION

Rather than employing a single dispersive delay line compressive receiver type spectrum analyzer, in the subject invention a compound chirp generator is provided in which fast chirps are matched to SEW dispersive delay lines, whereas slower chirps are matched to SAW devices. Here the SEW line provides coarse frequency bins which are refined by the SAW line.

By matching is meant that the chirp rate, e.g. the change in the number of cycles per second, is the inverse of the time delay vs. frequency curve of the delay line.

In one embodiment the fast chirp is superimposed over the slow chirp, such that only one chirp generator is required. In operation, the fast chirps are matched to the SEW line which has 20 megahertz frequency bins in one embodiment. These frequency bins provide relatively coarse resolution.

The slower chirp is matched to the characteristics of the SAW device, which has for instance, 30 kilohertz bins, with a plurality of 30 kilohertz bins being associated with a single 20 megahertz bin. The result is that through appropriate gating, the resolution of the conventional compressive receiver functioning as a spectrum analyzer is increased because the energy in a 20 megahertz bin is further processed by the SAW device along with the slow chirp so as to provide relatively fine resolution of the incoming signals in that bin.

The result is a spectrum analyzer which utilizes only one chirp generator. This cuts the power consumption at least in half, assuming that a follow-on spectrum analyzer would have to be coupled to the output of the original compressive receiver delay line to obtain the required resolution.

With the power consumption as well as equipment cost reduced, it is now possible to deploy many spectrum analyzer modules as listening devices. These listening devices in one embodiment include for instance, a pop up receive antenna, a signal recognition unit, and a simplified transmitter for transmitting the existence of signals of a predetermined type to a location remote from the listening device. If numbers of these devices are airdropped over an area, or are physically placed at various locations, then an area of substantial size may be monitored for radio traffic. Not only is the existence of radio traffic indicated by such a system, but also the type of signals, or indeed the identity of the sources of the signals can be provided so that identification of surveilled entities can be accurately determined.

If the spectrum analyzer modules are provided with GPS receivers, then if air dropped or indiscriminately placed, the location of a spectrum analyzer listening device can be ascertained, and with transmissions from numbers of these modules, the location of the source of the incoming signal can be determined. Moreover, if direction finding algorithms are utilized at the spectrum analyzer module, then by triangulation from two or more modules receiving the particular incoming signal, the location of the source can be pinpointed.

In summary, an inexpensive, small, low-power consumption, wide-band, high resolution spectrum analyzer is provided as a listening device for throw-away applications such as surveillance that involve deployment of large numbers of battery-powered spectrum analyzer modules to detect a signal source such as one generating two-way radio traffic. Power requirements are minimized by the utilization of only one chirp generator to elongate battery life while providing a high resolution result. In order to minimize power drain the spectrum analyzer includes a single compound-chirp Fourier Transform generator. The compound chirp generator is used in one embodiment with a surface acoustic wave, SAW, dispersive delay line in conjunction with a surface electromagnetic wave, SEW dispersive delay line. The compound chirp generator permits performing two spectrum analysis functions, one resulting in coarse resolution frequency bins, and the other resulting in refining the coarse resolution bins into fine resolution frequency bins for the high resolution required for signal recognition.

The chirp generator feeding the SEW line is composed of a series of fast, repetitive chirps, matched to the sew line, with these chirps superimposed over a slower chirp matched to the SAW line. The frequency bins are selected by timing gates synchronized to each of the chirps so that for a gross resolution involving 20 megahertz output bins, a series of fine resolution 30 kilohertz bins each encompassing a given 20 megahertz SEW line bin are provided to analyze one full 20 megahertz bin at a time. The subject module thus functions as a double spectrum analyzer, first resolving 20 megahertz bins and then breaking down each 20 megahertz bin into 30 kilohertz bins. In one embodiment, the detection of signals results in an alarm report being transmitted to a location remote from the listening device. If the spectrum analyzer modules are provided with GPS receivers, the location of the reporting spectrum analyzer module is made known, with numbers of reporting spectrum analyzer modules permitting location of the signal source. Alternatively, each spectrum analyzer module can be provided with direction finding algorithms and a compass to pinpoint the signal source through triangulation.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
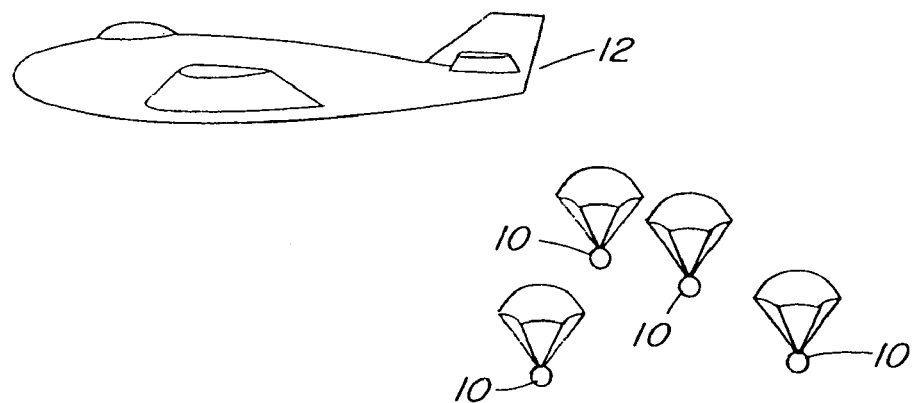
FIG. 1 is a diagrammatic illustration of the dropping of portable spectrum analyzer listening devices from an aircraft over an area to be surveilled.
Figure 2:
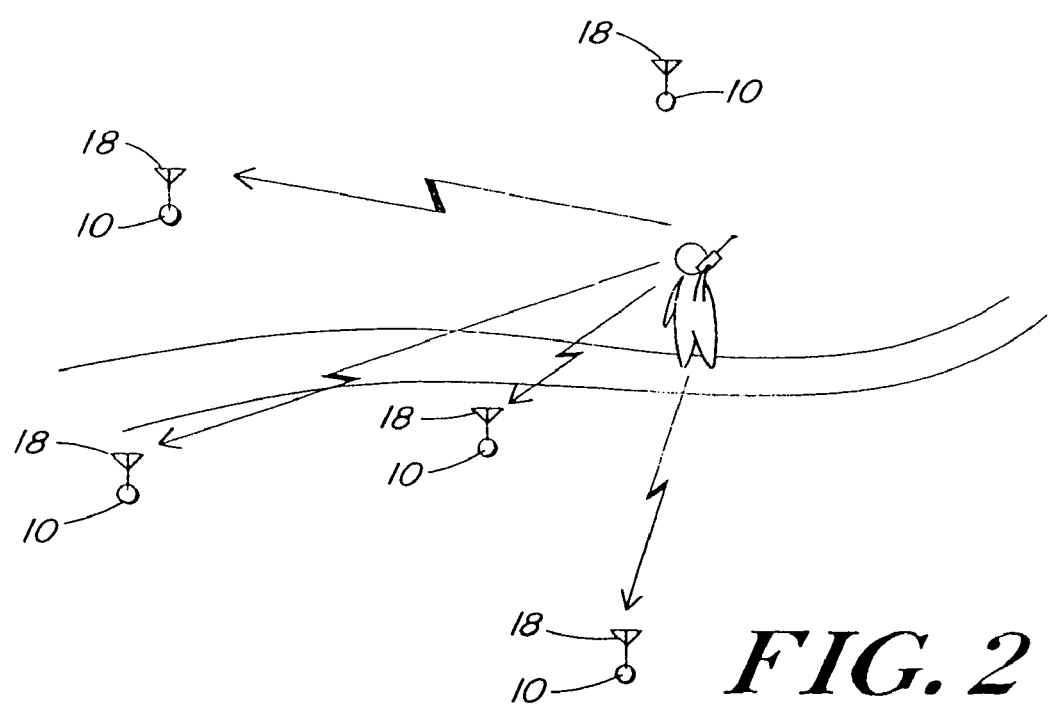
FIG. 2 is a diagrammatic illustration of the deployment of the listening devices around a path, with the listening devices being capable of receiving radio communications from an individual on the path.

Referring now to FIG. 1, in a surveillance operation a number of spectrum analyzer listening devices 10 are airdropped from an aircraft 12 so as to be randomly or indiscriminately deployed on the surface of the earth. In one scenario, as illustrated in FIG. 2, the airdropped devices 10 are deployed about an area which includes a path 12 to be surveilled. The purpose of dropping so many listening devices is that they will be able to intercept a transmission from a transceiver 14 carried by an individual 16 as he or she moves down path 12.

The individual may be part of a combat unit or may be any individual trying to communicate with another individual. In any event, the communication is done via RF transmission and with a modulation which is characteristic of the source of the radiation. This means that the source will have a certain spectral content which can be analyzed, with the source identified thereby.

In one embodiment, the listening devices are provided with pop-up antennas 18 which extend and deploy when the listening device impacts the surface of the earth.

In this way the plurality of the listening devices are used to intercept any radio communications which may exist within the area covered by the devices. In one embodiment, the frequency band coverage is between 2 and 2500 megahertz, with a bin size for the spectrum analyzer being 30 kilohertz and a scan time of 12.5 milliseconds, with the size of the listening device being 4 cubic inches.

Figure 3:
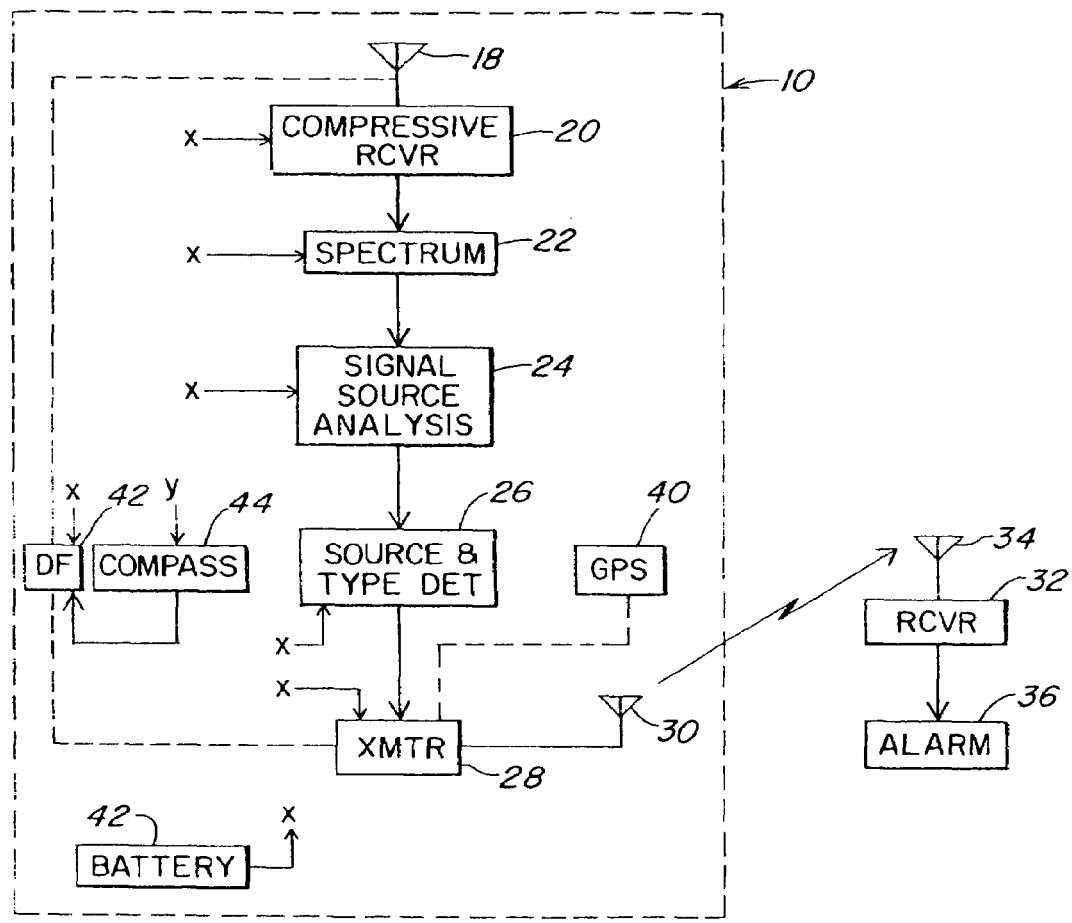
FIG. 3 is a block diagram showing a spectrum analyzer type listening device for identifying the source of intercepted signals and for transmitting the existence and type of the signals to a location remote from the listening device.

Referring now to FIG. 3, each listening device module includes in one embodiment a compressive receiver 20 connected to antenna 18 and from which spectral lines corresponding to the intercepted signals are available at 22. With the spectral lines available, signal source analysis unit 24 analyzes the amplitudes and the positions of the spectral lines and identifies the source and the type of transmitter that is utilized as illustrated in 26. The source and type of the signals are transmitted by a transmitter 28 via an antenna 30 back to a remote receiver 32 to which is coupled an antenna 34. Receiver 32 is utilized to detect and demodulate the transmission from transmitter 28, which includes at minimum the fact of an intercepted signal and it's frequency, with the transmission also including in one embodiment the type of the source generating the signal. Assuming that a signal of interest has been detected, an alarm 36 is activated at the remote location to indicate the presence of a transmission in the surveilled area, whether it be initiated by an individual or a machine.

It is possible to locate the whereabouts of the source whose signals have been intercepted through utilizing only the outputs of transmitters within the various listening devices. If the pattern of listening devices is quite compact, then at least the general area of the source of the intercepted signals may be obtained.

Assuming that each of the listening devices is provided with a GPS receiver 40 the position of the listening device can be transmitted via transmitter 28 to receiver 32, such that the location of the listening modules which have intercepted the transmitted signal can be ascertained. This then further identifies the location of the signal source.

For even further identification of the location of the signal source a direction finding unit 42 connected to antenna 18, and coupled to a compass 44 provides the angle of arrival of the intercepted signal, with triangulation being utilized to pinpoint the location of the source of the intercepted signal.

It will be appreciated that each of the listening device modules is provided with an internal battery 42 which is connected to each of the active elements within the listening device. It is the power drain of these elements which is of concern given the limited battery life of any battery used for this application.

In one embodiment the power consumption of the entire device is 5 watts, which leads to an operating duration of 240 minutes for a fully charged battery of 4 amp hours.

What makes possible the minimizing of the battery drain is the fact that adequate resolution for the spectral analyzer is provided through the utilization of a compressive receiver having two delay lines in which a dual chirp generator is employed, with the chirps being superimposed on each other, one chirp matching one of the delay lines, in this case a SEW line, and the other chirps matching the dispersive delay associated with a SAW device functioning as a dispersive delay line.

As has been explained, when using a compressive receiver with one dispersive delay line only one coarse frequency bin at a time can be analyzed, which in one embodiment is a 20 megahertz bin. Noting that a spectral line 20 megahertz wide does not provide much information about the source of the intercepted signal, a second dispersive delay line, in this case a SAW device, is provided with a gate, with the timing of the gate being such as to connect this SAW device to the output of the first dispersive delay line in a way in which the output of the SAW device further refines the 20 megahertz resolution of the spectrum analyzer. This is done by processing the signal information such that for each 20 megahertz frequency bin, 30 kilohertz spectral line resolution is possible.

With this resolution it is possible to utilize signal source analysis to provide source and type detection for identifying the source of the intercepted signal.

Note that the use of the dual chirp generator reduces the total power consumption associated with providing spectral resolutions of the type desired due to the fact that only one chirp generator is powered up.

Figure 4:
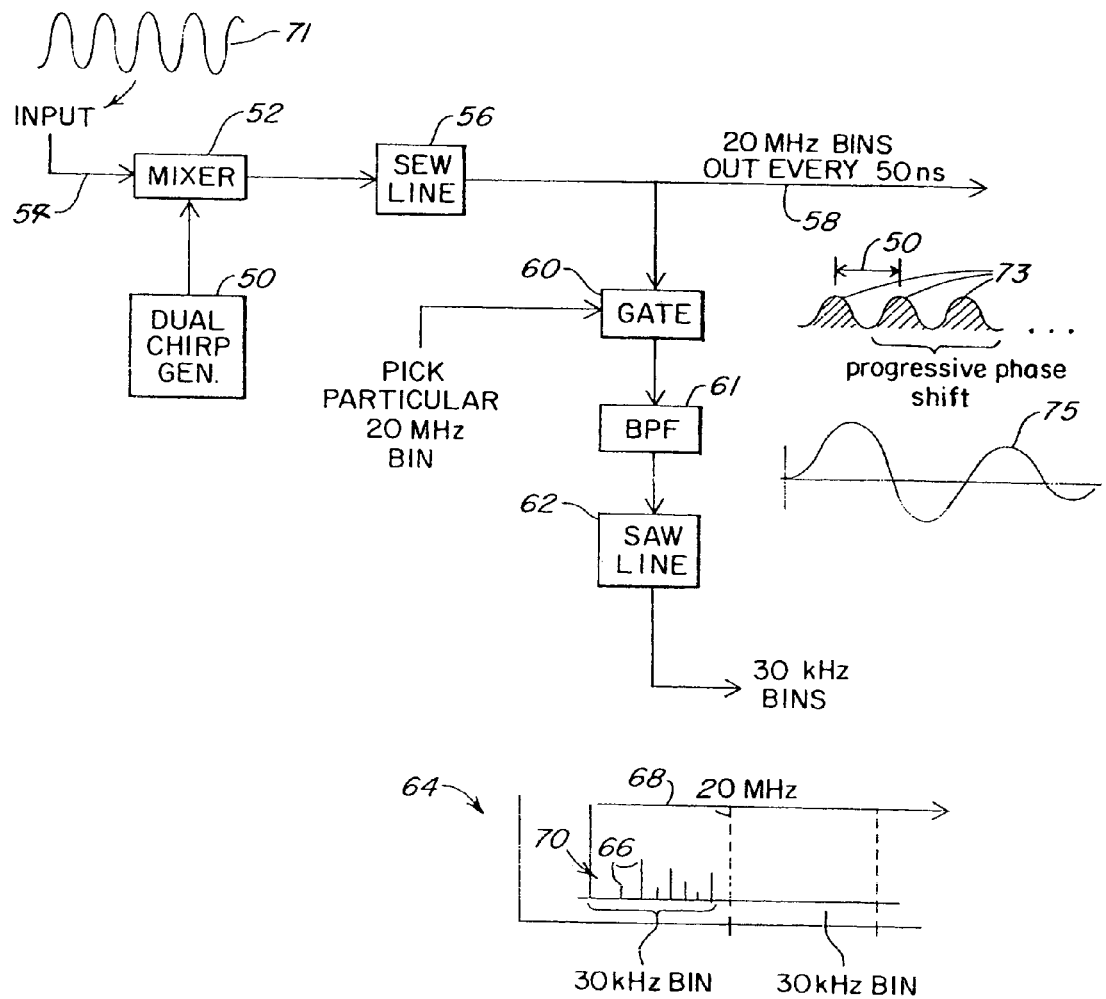
FIG. 4 is a block diagram illustrating the dual chirp spectrum analyzer for use as a listening device in the scenario of FIGS. 1, 2 and 3 in which a portion of the dual chirp is matched to a SEW line, and in which another portion of the dual chirp is matched to a SAW line, thereby to provide a high resolution spectral line output over a wide bandwidth; and, FIG. 5 is a series of wave form diagrams illustrating the generation of the dual chirps, illustrating chirps which are matched to one line, with the chirp phase. of the signals within a chirp being delayed by a quadratic phase shift to provide the chirps matched to a second line.

Referring to FIG. 4 a block diagram of the spectrum analyzer includes the aforementioned chirp generator here illustrated at 50, coupled to a mixer 52 to which an input signal 54 is coupled. In one embodiment chirp generator 50 is a direct digital synthesizer available commercially from Analog Devices as model AD9858DDS.

This digital synthesizer is programmed such that for each successive chirp an ever increasing progressive phase shift is added to the original chirp. The phase shifts added are in a quadratic progression, with the result being that when passed through a band pass filter 61 one obtains a very elongated chirp matched to the SAW line.

The output of mixer 52 is coupled to a SEW line which is a dispersive delay line 56, the output of which at 58 is a 20 megahertz bin, which is outputted once every 50 nanoseconds. Note that SEW line 56 may be a spiral SEW dispersive delay line as described in U.S. Pat. Nos. 4,808, 950 and 5,029,235.

One part of the dual chirp, the fast chirp, is matched to the SEW line so as to provide the 20 megahertz bins.

As illustrated a gate 60 is coupled to the output of SEW line 56 and is clocked by a pulse, so as to pick the particular 20 megahertz bin selected for further refinement in terms of the resolution of the spectral lines. The output of gate 60 is applied through band pass filter 61 set to pass the slow chirp from chirp generator 50 to a SAW dispersive delay line 62, the output of which are 30 kilohertz bins, such as illustrated at 64. Here, fine spectral lines 66 are the result of having the output of a first dispersive delay line processed by a second dispersive delay line. Thus in each 20 megahertz bin as illustrated by arrow 68, there may be a number of spectral lines 66 in bin 1 as illustrated by arrow 70. There may be no spectral lines in a second 30 kilohertz bin as illustrated at 72, such that in the illustrated example, intercepted signals appear to have spectral components in the first of the 30 kilohertz bins.

In operation, a CW input signal 71 when mixed with the output of chirp generator 50 produces pulse bursts 73 at the output of gate 60 which are separated by 50 ns. Due to the progressive quadratic phase shifting of the fast chirps every 50 ns, after 1000 or so chirps, each having a progressively phase shifted signal, and after band pass filtering, the result is a slow chirp 75 matched to SAW line 62.

Figure 5:
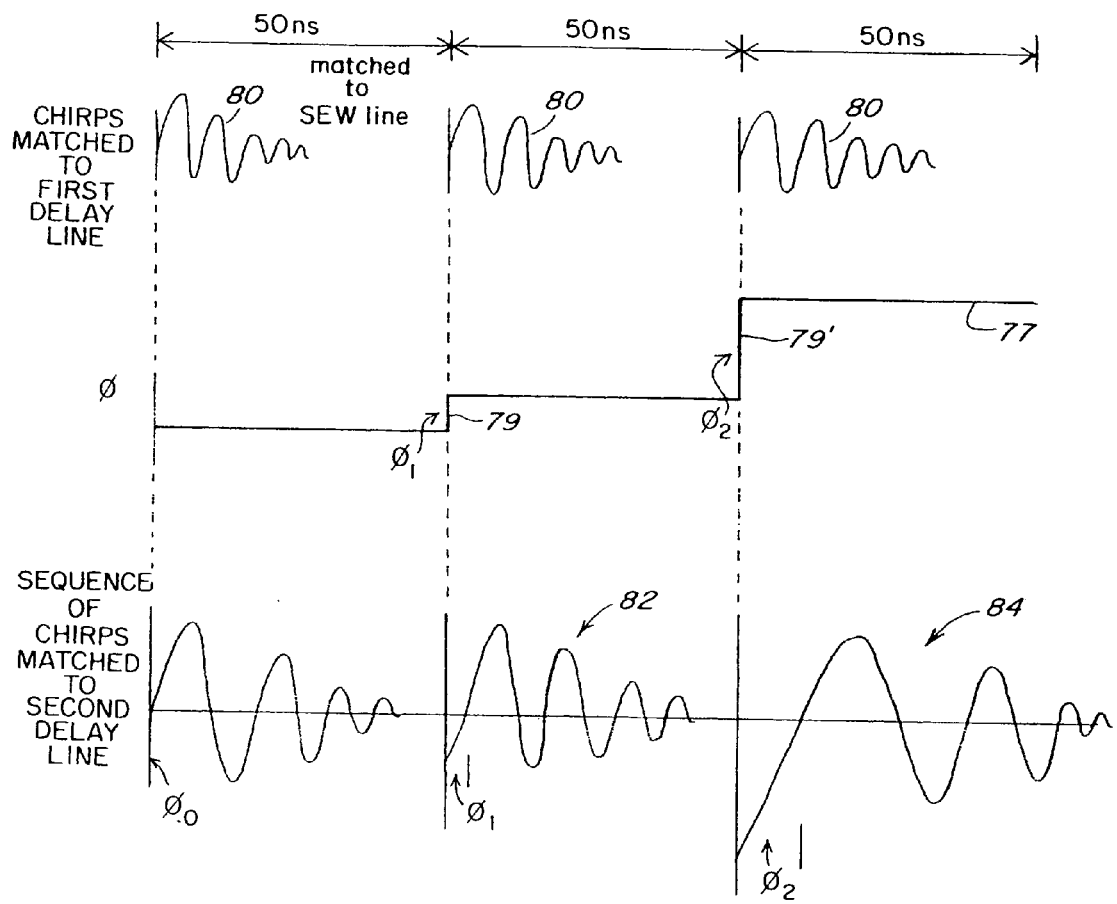

Referring now to FIG. 5, in order to provide for the dual chirp generator, the chirps which are matched to the first delay line, e.g. SEW line 56, are produced once every 50 nanoseconds, as illustrated at 80. In order to derive the slower chirp suitable for SAW line 62, the start of the chirps are delayed by a predetermined progressive phase shift here denoted by $\phi$. This is accomplished by changing the phase of the chirp every 50 nanoseconds, with the change being quadratic in nature. This is shown by step function 77 where the phase shift is denoted by the height 79 of the step function. $\phi_1$ illustrates a phase shift 79 relative to $\phi_0$, whereas $\phi_2$ involves a quadratic phase shift $79^1$ relative to $\phi_1$, thus producing the phase shifted chirps which start as illustrated at arrows 82 and 84. The quadratic phase shifts are easily generated through the use of the aforementioned dual chirp generator from Analog Devices by simply programming a progressive quadratic change in phase every 50 nanoseconds.

In this way a single chirp generator is provided in which a second set of chirps is superimposed on top of a first set of chirps, with the second set of chirps being slower as illustrated at 75 in FIG. 4.

What will be seen is that through the utilization of a single chirp generator, the power consumption for the entire listening device is one-half that which would be necessary to provide the required spectral resolution for intercepted signals utilizing cascaded conventional compressive receivers and dispersive delay lines. Not only is the presence of a signal detectable by the listening device, its source and type may be ascertained due to the high resolution spectral analysis which is done on the intercepted signal by the subject simple spectrum analyzer.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a system that does not rely on illuminating a target, a surveillance method for passively detecting from its spectral signature the identity of a received signal from an unilluminated source that is transmitting a signal, comprising the steps of:

deploying a battery-powered unit having a spectrum analyzer that outputs a series of spectral lines, the position and amplitude of which characterize the identity of a received signal from an unilluminated signal source, the battery-powered unit having a signal source recognition unit coupled to the spectrum analyzer for analyzing the spectral content of the received signal to ascertain the identity of the signal source, and a transmitter for transmitting the results of the signal source recognition unit to a remote location, said spectrum analyzer including a single dual chirp generator and both a first dispersive delay line and a second dispersive delay line, with the two different chirps from the dual chirp generator matched to the respective delay lines, whereby power consumption is limited through the use of a single chirp generator thus to maximize the longevity of the battery powered unit deployed; and, receiving the transmittal signal at the remote location and providing an indication of the presence and identity of the unilluminated signal source.

2. The method of claim 1, and further including in the deployed unit a direction finding system for ascertaining the direction of an incoming signal from the signal source and for transmitting the direction of the incoming signal to the remote location.

3. The method of claim 1, and further including in the deployed unit a geophysical location detection system for determining the location of the deployed unit and for transmitting the determined location to the remote location, with transmissions from a number of deployed units permitting determination of the location of the signal source the signal of which is recognized by the signal source recognition unit.

4. The method of claim 1, and further including in the deployed unit a direction finding system for ascertaining the direction of an incoming signal and a geophysical location detection system for ascertaining the location of the deployed unit, and, coupling the outputs of the direction finding system and the geographical location detection system to the transmitter, whereby with reports from a number of deployed units the location of the source of the incoming signal can be ascertained by triangulation.

\* \* \* \* \*